Oct. 28, 1958 M. S. SCHNEIDER 2,858,266

PLATING RACK

Filed May 15, 1957 2 Sheets-Sheet 1

INVENTOR.
May S. Schneider.
BY,
Olson, Mecklenburger, von Holst, Pendleton, & Newman. Attys.

Oct. 28, 1958 M. S. SCHNEIDER 2,858,266

PLATING RACK

Filed May 15, 1957 2 Sheets-Sheet 2

INVENTOR.
Max S. Schneider
BY.
Olson, Mecklenburger, von Holst, Pendleton, & Neuman. Attys.

United States Patent Office 2,858,266

Patented Oct. 28, 1958

2,858,266

PLATING RACK

Max S. Schneider, Chicago, Ill.

Application May 15, 1957, Serial No. 659,326

3 Claims. (Cl. 204—297)

The present invention relates to an improved plating rack assembly and, more particularly, to clamp means utilized therein.

The need for quickly and efficiently erecting plating racks which are adapted to securely hold articles of various sizes and shapes is indeed well known in the plating art. The ease and rapidity with which an electroplater can erect a rack to properly support articles to be plated has a direct bearing on the profit to be made. Time-consuming drilling, welding, and similar operations lessen the ultimate profit to be realized and, if the resulting rack construction is of a permanent type, the reuse of the same in conjunction with articles having a different size and shape is precluded.

It is an object, therefore, of this invention to provide a plating rack assembly which can be readily erected to conform with the size and shape of a multitude of articles with an ease of asesmbly which has heretofore been unknown in the art.

It is a further object of this invention to provide a clamp member for use with the provided rack assembly which is constructed so as to substantially eliminate possibility of misalignment of rack parts in the normal position of assembly.

It is yet another object of this invention to provide a rack construction which may be readily assembled into a sturdy rack and subsequently disassembled for further use with articles of different shapes and sizes.

It is a still further object of this invention to provide a plating rack assembly which insures desired current flow to the articles being plated.

The above and other objects of this invention will become more apparent from the following detailed description when read in the light of the accompanying drawing and the appended claims.

In one embodiment of the provided rack assembly a substantially U-shaped clamp member is provided for use with a main conductor or bus bar well known in the art. The U-shaped clamp has opposed apertured side portions which are adapted to straddle the main conductor. The clamp has a bight portion interconnecting the clamp sides and partially encompasses a peripheral portion of the main bus bar in the normal position of assembly. The apertured clamp sides are traversed in the normal position of assembly by an auxiliary conductor which may comprise any one of a large number of conductors whereby the clamp and conductor assembly completely encompasses a peripheral portion of the main conductor.

Although the main conductor is snugly receivable between the clamp sides, the latter conductor is not snugly received in the interval between the clamp bight portion and the auxiliary conductor. A securing means, which may comprise a bolt member, engages a tapped aperture in the clamp bight portion and, upon engaging and bearing against the main conductor, forces the auxiliary conductor passing through the clamp sides to tightly bear against a peripheral portion of the main bus bar, resulting in a tight clamping engagement and large contact area through which current may flow.

The provided rack assembly is highly flexible since the clamp means may be readily moved to any desired position along the length of the main bus bar by merely loosening the securing bolt. The auxiliary conductor means passing through the clamp sides may comprise any one of a large number of conductor forms as will hereinafter be made apparent, adding still further to the flexibility of the provided rack construction.

For a more complete understanding of this invention, reference should now be made to the drawings, wherein Figure 1 is a perspective view of a plating rack assembly in which a variety of auxiliary conductor members are illustrated secured to a main bus bar by means of a clamp member provided by this invention;

Figs. 2, 3 and 4 are enlarged fragmentary sectional views taken on lines 2—2, 3—3 and 4—4, respectively, of Fig. 1;

Figures 1, 2, 3, 4, 5:
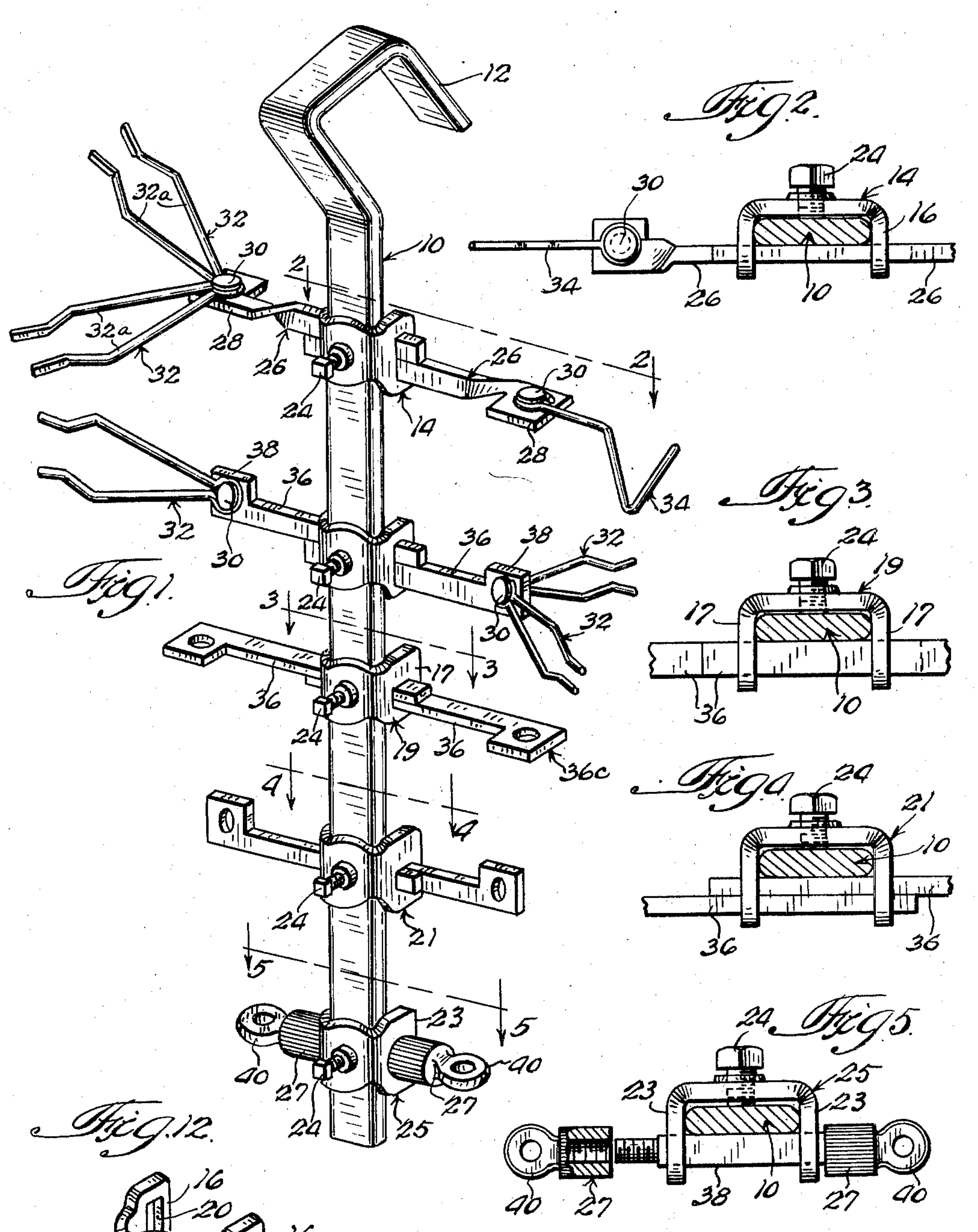
Fig. 5 is an enlarged sectional view taken on line 5—5 of Fig. 1.
Figure 12:
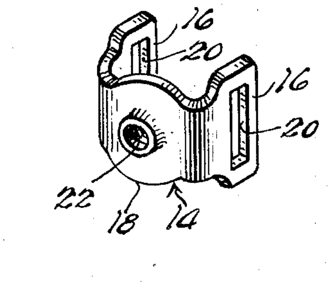
Fig. 12 is a perspective view of one embodiment of the clamp provided by this invention.

Referring now, more particularly, to Fig. 1, a main conductor or bus bar 10 is illustrated which has an upper end limit 12 which is appropriately formed so as to engage and depend from a conducting member (not shown) providing a source of negative current for the plating operation in which the illustrated apparatus may be used. In the normal electroplating operation, the workpiece to be plated is secured to a rack assembly which is charged with negative electricity so as to become the cathode in an electroplating cell. Positive metallic ions which are in the plating solution surrounding that portion of the plating rack assembly to which the work articles are attached are drawn or attracted to the negatively charged articles and have their own positive charge neutralized, thereby resulting in a metallic plate on the article.

It is believed apparent that a desired plating rack assembly should be adapted to be readily erected with a minimum expenditure of time and labor. Those racks which require a number of operations such as welding and riveting in the course of producing a permanent type rack which is suitable only for articles of a specific size and configuration are well known in the art and are undesired because of their obvious disadvantages. However, if a plating rack assembly is flexible enough so as to have the workpiece hangers adjustable to conform with the size and shape of a number of workpieces which differ substantially in size and shape, such a rack assembly would be in great demand. Such an assembly is hereinafter described.

The numeral 14 in Fig. 1 and throughout the other figures in the provided drawing designates a unitary clamp member which facilitates the erection of a plating rack assembly. As will be most readily seen from Fig.

12, the clamp member 14 is of simple construction being of substantially U-shaped configuration and comprises opposed side portions 16 maintained in spaced relationship by an interconnecting bight portion 18. The opposed sides 16 are apertured at 20 and the latter apertures are in exact axial alignment as is apparent from an inspection of the remaining figures in the provided drawing which will hereinafter be discussed in detail. The bight portion 18 of the clamp is provided with a tapped aperture 22, the purpose of which is to engage a threaded securing means such as a bolt member for a purpose which will hereinafter become apparent.

Referring again to Fig. 1, it will be noted that in a normal position of assembly, the opposed sides 16 of each clamp 14 are intended to straddle the width of the main conductor or bus bar 10 and snugly receive the same therebetween. The nature of the clamp-bus bar relationship will be most apparent from the sectional views of Figs. 2 through 5. It will be further noted from Figs. 1 and 2 that the apertures 20 in the clamp sides are spaced a sufficient distance from the clamp bight portion so as to enable a single or plurality of auxiliary conductor means to traverse the apertures and, in effect, define with the clamp member a confining area and periphery which are precisely the same as those of the cross section of the main bus bar 10, as is also most apparent from the sectional views of Figs. 2 to 5. Although the periphery defined by the bight portion and sides of the clamp 14 in combination with the surface of a traversing auxiliary conductor means is precisely the same as that of the main bus bar cross section, it will be noted from Figs. 2 through 5 that the cross section of the bus bar 10 is of slightly greater width.

Consequently, a means must be provided which will compensate for this lack of width, and the latter means comprises bolt member 24 illustrated in the various views. The latter bolt member threadedly engages the tapped aperture 22 in each of the clamp members 14 and forces whatever auxiliary conductor means which may traverse the sides of the clamp member to frictionally engage in a tight clamping relationship an opposed surface of the main bus bar 10. The bolt means 24 is thus seen to comprise a securing means which enables the formed plating rack to attain a rigid condition of assembly.

Figures 6, 7, 8, 9:
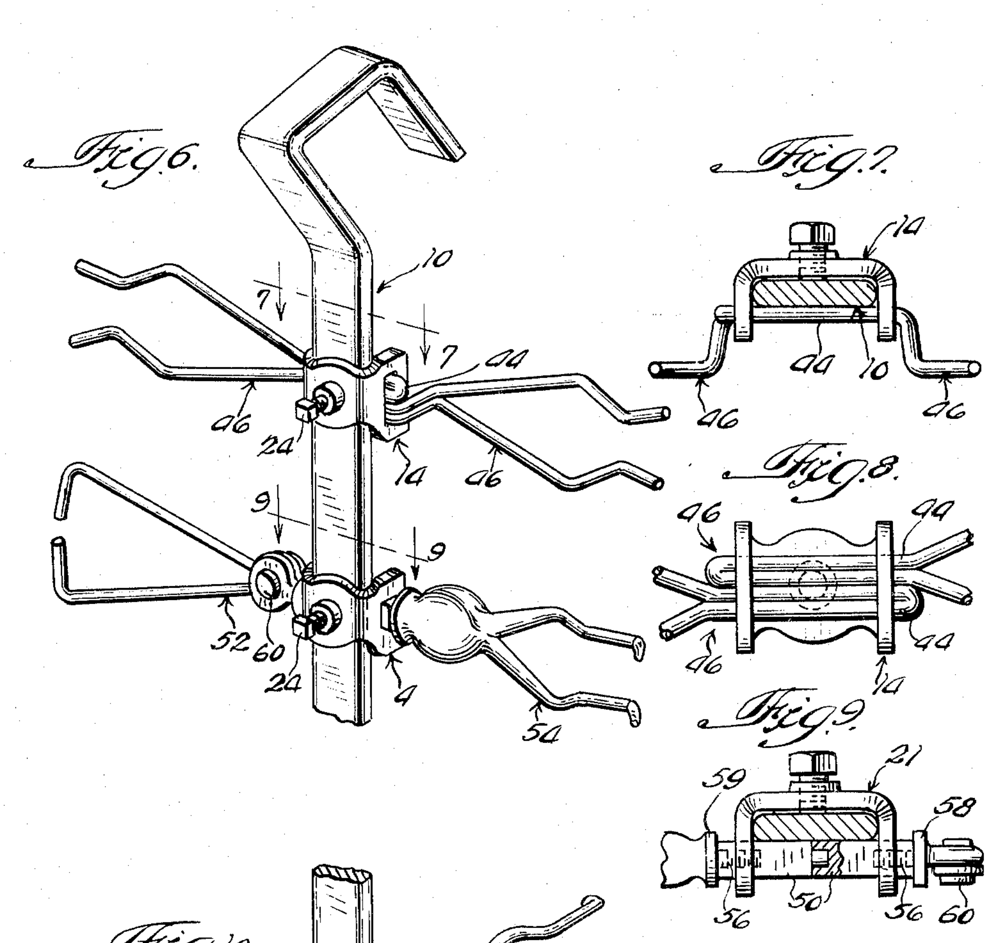
Fig. 6 is a fragmentary perspective view similar to Fig. 1 in which auxiliary conductor means are illustrated secured to a main bus bar by means of the clamp member provided by this invention.
Fig. 7 is an enlarged fragmentary sectional view taken on line 7—7 of Fig. 6.
Fig. 8 is a fragmentary view in elevation taken at right angles to the rack assembly fragment illustrated in Fig. 7.
Fig. 9 is an enlarged fragmentary sectional view taken on line 9—9 of Fig. 6.

The number and variety of auxiliary conductor means which may be employed with the provided clamp 14 and the illustrated bus bar 10 is apparent in Figs. 1 and 6. The uppermost auxiliary conductor means in Fig. 1 comprises cross bars 26 which have enlarged, apertured end limits 28 in which enlarged-head pin members 30 are disposed for purposes of engaging article holders such as spring tips 32. An article to be plated may either be hooked on an article holder such as holder 34 or else resiliently engaged by the opposed legs *32a* of the spring tips 32. The latter tips are utilized with items having an aperture or recess enabling the opposed tips to engage opposed aperture or recess defining portions.

It will be noted from Fig. 1 that each of the cross bars 26 has a shank portion whilch overlaps with the shank portion of the adjacent cross bar. The length of the latter shanks allows flexibility in the course of disposing the article to be plated at a predetermined distance from the main bus bar 10.

Cross bars 36 in Fig. 1 are precisely the same as cross bars 26 with the exception that the enlarged end portions 38 are not twisted relative to the shank portion of the cross bar and consequently remain in a vertical plane. As a result the spring tips 34 secured to the cross bars 36 will also be disposed in a vertical plane.

The central auxiliary conductor depicted in Fig. 1 is designated by numeral *36c* and is illustrated with the face surfaces of the cross bars 36 disposed in the horizontal plane. This latter planar disposition is, of course, a direct result of the manner in which opposed sides 17 of clamp member 19 are apertured. It is, of course, quite obvious, more particularly from Fig. 3, that the opposed sides 17 must be of greater length than sides 16 of clamp 14 to enable the full width of the face surfaces of the cross bars 36 to traverse the same.

In Fig. 4 a clamp member 21 is illustrated which is apertured in a third modified manner whereby the traversing cross bars 36 may have their shank portions overlap with their face surfaces in the vertical plane but in different vertical planes as distinguished from the cross bars of Fig. 1 previously described.

As will be most apparent from Fig. 5, a stud member comprises a portion of the auxiliary conductor means which is disposed on the lowermost portion of the bus bar 10 of Fig. 1. To receive the stud member, walls 23 of illustrated clamp 25 are annularly apertured. The knurled nut members 27 illustrated in Figs. 1 and 5 threadedly engage the opposed end limits of the stud member 38. The latter nuts have apertured end portions 40 for purposes of having article-engaging means such as hooks 34 and spring tips 32 secured thereto by means such as the securing pins 30 illustrated in Fig. 1.

In Fig. 6 it will be noted that elongated clip bight portions 44 of modified spring tips 46 may comprise the auxiliary conductor means portion which functions in conjunction with the illustrated clamp 14 for purposes of being secured in fixed position to a peripheral portion of the illustrated bus bar 10. Utilizing the spring tips 46 of Fig. 6, the article hanger and the auxiliary conductor means may be the same. The sectional view illustrated in Fig. 8 depicts the manner in which each of the collapsed bight portions 44 of each spring tip 46 traverses both of the clamp apertures and further illustrates the overlapping arrangement of the bights.

In Figs. 6 and 9 another modified arrangement is illustrated in which two interlocking rod portions 50 of square cross-sectional configuration are utilized in conjunction with opposed spring tip members 52 and 54. The portions 50 interlock by means of the illustrated stud and socket engagement. As is most apparent from Fig. 9, each distal end of the interlocking rod portions 50 are internally tapped at 56 so as to engage threaded end limits of spring tip holders 58 and 59. The latter holders engage spring tips 52 and 54 by utilizing illustrated rivet members 60. Spring tip holder 54 is illustrated covered with a protective layer of a plastic material. Consequently, the rivet member 60 of the spring holder 58 used in conjunction with spring tip 54 is not visible.

Figure 10:
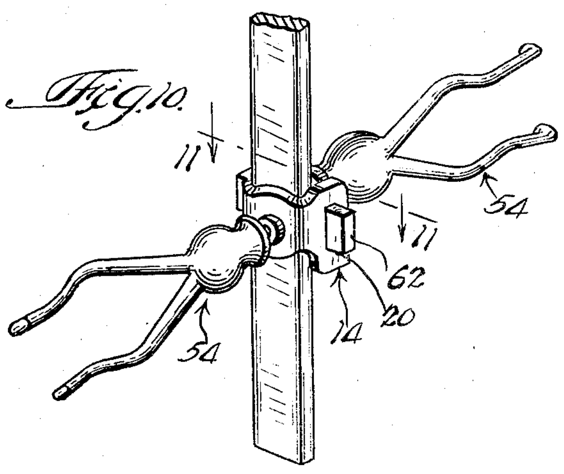
Fig. 10 is a fragmentary perspective view illustrating a modified auxiliary conductor means secured to a main bus bar.
Figure 11:
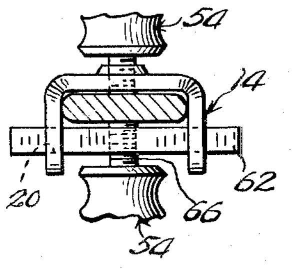
Fig. 11 is an enlarged fragmentary perspective view taken on line 11—11 of Fig. 10.

Figs. 10 and 11 disclose a further modified rack assembly in which the illustrated clamp 14 is utilized in conjunction with a short bar segment 62 which traverses the apertures 20 of the clamp 14. The illustrated spring tips 54 of Fig. 10 are illustrated as threadedly engaging the tapped apertures 22 of the illustrated clamp 14 and the tapped aperture 66 which is formed in the bar segment 62. Thus, in Figs. 10 and 11, an assembly is illustrated in which the spring tips or article holders themselves function as a securing means frictionally securing the clamp and auxiliary conductor to the main bus bar 10.

It is thus seen from the above descriptions that novel plating rack assemblies have been provided which utilize unitary clamp means which may readily be fabricated by a simple stamping operation. This latter means of manufacture assures the alignment of the apertures and eliminates any possibility of misalignment which is commonly found when clamp members composed of a plurality of parts are utilized. The provided clamp member may be applied immediately and directly to any peripheral portion of a bus bar. The provided clamp need not be inserted over a bus bar end limit.

Although in the normal course of utilizing the provided rack constructions, the conducting parts of the rack are covered with a protective plastic material, such as any one of a number of vinyl resins, polyethylene, etc., for the obvious purpose of preventing metal loss of plating solution and embrittlement of the plating rack components, it is believed apparent that the provided plating rack assembly may be rapidly rearranged after the protective plastic has been removed to conform with the needs of articles to be plated which are possessed of new and different sizes and configurations.

The provided rack assembly is composed of a minimum number of simple parts which enable a flexible plating operation to be effected which has heretofore been unobtainable. The provided components require no special tools and may be assembled and disassembled by any ordinary workman. The provided components may be arranged relative to each other so as to exactly conform with the size and configuration of any specific article to be plated.

I claim:

1. An electroplating rack comprising a main current conductor, clamp means having opposed substantially parallel side portions straddling and snugly receiving said main conductor therebetween, said side portions being maintained in spaced relation by means of an interconnecting clamp portion formed integrally with corresponding end portions of said side portions, said side portions having aligned apertures substantially equidistant from said interconnecting clamp portion, an auxiliary current conductor traversing said apertures and snugly receivable therein and cooperating with said clamp means in surrounding a peripheral portion of said main conductor, said auxiliary conductor effecting electrical contact with said main conductor over an area substantially the height of the apertures and the width of the main conductor, means cooperating with said clamp means interconnecting portion for forcing said main conductor into snug electrical contact with said auxiliary conductor; said clamp means being directly disengageable from said main conductor upon disengagement therewith of said auxiliary current conductor.

2. An electroplating rack comprising a main current conductor, clamp means having opposed substantially parallel side portions straddling and snugly receiving said main conductor therebetween, said side portions being maintained in spaced relation by means of an interconnecting clamp portion formed integrally with corresponding end portions of said side portions, said side portions having aligned apertures substantially equidistant from said interconnecting clamp portion, at least two discrete auxiliary current conductor means traversing both of said clamp apertures, the cross-sectional area of said auxiliary current conductor means being substantially equal to that of the clamp apertures so as to be snugly receivable therein, said auxiliary current conductor means portions intermediate said clamp apertured portions cooperating with said clamp means in surrounding a peripheral portion of said main conductor, said auxiliary conductor means effecting electrical contact with said main conductor over an area substantially the height of the apertures and the width of the main conductor, means cooperating with said clamp means interconnecting portion for forcing said main conductor into snug electrical contact with said auxiliary conductor means; said clamp means being directly disengageable from said main conductor upon disengagement therewith of said auxiliary current conductor means.

3. An electroplating rack comprising a main current conductor, clamp means having opposed substantially parallel side portions straddling and snugly receiving said main conductor therebetween, said side portions being maintained in spaced relation by means of an interconnecting clamp portion formed integrally with corresponding end portions of said side portions, said side portions having aligned apertures substantially equidistant from said interconnecting clamp portion, an auxiliary current conductor traversing said apertures and snugly receivable therein and cooperating with said clamp means in surrounding a peripheral portion of said main conductor, said auxiliary conductor effecting electrical contact with said main conductor over an area substantially the height of the apertures and the width of the main conductor, said clamp means interconnecting portion having a tapped aperture for receiving an adjustable cooperating bolt member therein, said bolt member bearing against said main conductor forcing the same into snug electrical contact with said auxiliary conductor; said clamp means being directly disengageable from said main conductor upon disengagement therewith of said auxiliary current conductor.

References Cited in the file of this patent

UNITED STATES PATENTS

| | | |
|---|---|---|
| 1,129,241 | Smith | Feb. 23, 1915 |
| 1,309,240 | Chappuis | July 8, 1919 |
| 2,208,358 | Chandler | July 16, 1940 |
| 2,512,554 | Schneider | June 20, 1950 |
| 2,734,859 | Reilly et al. | Feb. 14, 1956 |